Patented Apr. 24, 1934

1,955,738

UNITED STATES PATENT OFFICE 1,955,738

METHOD OF DISPERSING PIGMENTS

Emile C. de Stubner, New York, N. Y.

No Drawing. Application January 18, 1929,
Serial No. 333,523

7 Claims. (Cl. 134—35)

This invention relates to the manufacture of pigments and pigmented products, and has in view the saving of much of the time, labor and expense incident to the methods and practises heretofore employed in such manufacture. The invention is more particularly concerned with the incorporation of the pigments with the products or materials to be colored or filled and the invention has for its main object the production of such pigments, fillers, abrasives, etc. in a form which will adapt it to be incorporated directly in the product or material to be colored or filled, such for instance, as: lacquers, paints, enamels, printers ink, etc., without the laborious expensive and time-consuming drying and grinding treatments which have heretofore been resorted to.

Under the practice now carried out in making pigmented precipitates (which are usually placed on the market in dry form), and incorporating them in the materials or products to be colored, there are mixed together solutions of the appropriate constituents to form the color desired, and the precipitate is separated from the solutions by filtration or by a centrifuge or similar means, leaving the precipitate in the form of a sludge or filter cake. This sludge is placed in heating ovens through which a large volume of air is blown in order to carry off the moisture, and the pigment is left in dry chunks, which are often baked together according to the temperature maintained in the drying process. These chunks are now powdered in reducing mills, such as pebble-mills, cone-mills, and the like, and the powdered pigment is subjected to frequent siftings in order to bring about uniformity in the market product. In incorporating this dry powdered pigment in the products or materials to be colored, such for instance as in a lacquer to color the same, the pigment is introduced into the lacquer and subjected therein to a grinding and mixing operation, in most cases occupying a period of 48 hours or more, in order to bring about that degree of fineness and intermixture of the materials which will produce a smooth colored lacquer free from particles or lumps of the pigmented precipitate. The steps in the above described procedure of drying the filter sludge and thereby forming a cake or lump, the grinding of this dried cake or lump to make it fine, and the further grinding and long continued intermixing of the fine pigment powder in the material or vehicle of the product to be colored, consumes much time and labor and results in correspondingly great expense.

Under the foregoing practice the aim of which is to ultimately bring about a sub-division of the pigment of the maximum fineness, the original fineness which was brought about in the precipitating action, is destroyed by the drying and the formation of the sludge into cakes, and makes it necessary in order to restore the former condition of fineness, to resort to the expensive and time-consuming steps above referred to, including the drying and grinding treatments.

In accordance with my invention in its preferred form I dispense with the formation of the filter sludge into cakes, and its subsequent grinding to reduce it to fineness, and the further grinding to incorporate it in the article or material to be colored, and I form the precipitate and treat it in such manner that it may be incorporated with the product or material to be colored by a mixture of the two, without the necessity of subjecting the same to any drying or grinding action, thereby saving the expense and time incident to such operations. Further in accordance with my invention I produce a pigment of novel form, which may be placed on the market as such, ready to be used as above described.

My invention therefore consists, insofar as this phase of the same is concerned, of a pigment of improved form, and in the process of making the same.

In the production of pigmented lacquers in accordance with my invention, the improved pigment may be introduced directly into clear lacquer and a color imparted to the lacquer in this way. In producing my improved pigment I treat a water wet pigment, such as for instance, a filter-cake as it comes out of the filter-press after it has been washed free from by-products (salts) of its formation, and replace the water by a fluid which is miscible or compatible with or forms a part of the product or material to be colored or filled. This replacement of the water is accomplished by and in the vapor-phase of the replacing fluid resulting in the formation of my improved pigment which now is damp with the replacing fluid. The pigment thus produced may be placed on the market in this form and may be employed to produce and color different products and materials such as lacquers, printers ink, paints, enamels, celluloid, artificial leather, explosives, films, collodion, etc. etc.

The manner of carrying out the improved processes above mentioned, and the characteristics of the improved products and articles resulting therefrom, will be described in detail in the examples to follow, the scope of the invention being set forth in the appended claims.

In producing my improved pigment, solutions of appropriate constituents to throw down a precipitate of the desired color, are mixed together, and the precipitate resulting from the chemical reaction, is separated from the supernatant liquor solvents, by running off or siphoning the liquor, or by other suitable means. The separated precipitate is now washed in a large quantity of water, in which the precipitate is stirred for a short time, so as to get rid of the solvents and the by-products resulting from the reactions of the solutions on each other, thereby giving the precipitate the form of sludge. The precipitated sludge is next freed of adhering water, as by filtering or by centrifuge or other mechanical means, whereby there is formed a hydrated sludge of greater stiffness than that resulting from the washing; and finally this sludge is freed from water by adding continuously to it a replacing fluid miscible with a constituent of the material or product with which the pigment precipitate is to be incorporated, whereby there is produced a pigmented precipitate damp or wetted with the replacing fluid.

The pigment thus produced may be placed on the market in this form, and may be employed to produce and color different products and materials such as lacquers, printers ink, paints, enamels, celluloid, artificial leather, explosives, films, collodion, etc. etc. For instance, in coloring lacquer the damp pigment is mixed with clear lacquer; in making printers ink, the precipitate would be mixed with printing-ink varnish; in making paint, it would be mixed with linseed oil, and in making enamels, it would be mixed with varnish, and so on, it being understood that in each case, the replacing fluid should be of such nature as to be miscible with the material or product such as a coating composition or plastic composition or some constituent thereof, which is to be colored or produced but differing among other respects from the said material or product in that it does not possess the film-forming or plastic properties of the material to be colored or produced in any substantial degree. For instance, where the pigment is to be employed for coloring lacquer, a suitable replacing fluid would be toluene; and where the pigment is to be used for making printers ink, paints, enamels, etc., a replacing fluid in the form of acetone or pyridin would be suitable, the point being that in freeing the pigment from water in accordance with my invention, such a replacing fluid should be employed which will give the pigment, damp with such fluid, an affinity or solubility for the material or product with which it is to be incorporated at the same time being compatible therewith.

It will be understood that in the preparation of the pigment as above described, no drying or grinding operations are resorted to, and the fine precipitated form of the pigment in the form and fineness produced by the precipitation in the first instance, is preserved and maintained without the same undergoing any treatment tending substantially to destroy or alter such fineness.

I will now describe a specific instance of the practice of my invention in making a yellow pigment designed to be mixed with clear lacquer to give a yellow color to the same.

In one tank is placed a solution containing 294 lbs. or thereabout of potassium bichromate of a strength of approximately 2 to 5%. In another tank is placed a solution of similar strength of 379 lbs. or thereabout of acetate of lead (commercially known as sugar of lead). The contents of these two tanks are mixed together, as by pouring one into the other, and due to the chemical reaction of the solutions on each other, there will result a precipitate of about 640 lbs. of lead chromate in a state of exceeding fineness and uniformity. This precipitate settles on the bottom of the tank, and the supernatant liquor is run off and the remaining pigmented precipitate is washed to free it of the solutions, and the by-products resulting from the chemical reaction. When the washing is considered sufficient, the precipitate will be left in the form of a sludge in the bottom of the tank. This sludge precipitate is now freed of its adhering water by a filter-press or centrifuge or other suitable means, thereby giving the sludge greater stiffness. Next the sludge is added, with rapid agitation, to sufficient toluene to form an emulsion which may easily be pumped by a centrifugal pump. The result is a finely dispersed pigment in a mixture of toluene and water. This dispersion is now transferred into a still fitted with a jacket and agitator. Under continuous agitation heat is applied until a continuous distillate of toluene will be found as a layer on top of the water and it is, after separation from the water, returned into the still until the distillate shows that all the water has been replaced by the toluene. This can be easily recognized first by the condensate no longer showing two layers and secondly in the rise of the temperature in the still, for whereas the boiling-point of the water-toluene mixture is 84° C., the toluene boils at 110° C. The toluene in the still, which may be in excess of the quantity desired in the pigment or in fact all of it, if for any reason it is desired to obtain the pigment in its dry form, may be driven over either by raising the temperature to its boiling point or by applying a vacuum. Should the latter procedure be resorted to either to produce a dry pigment or the improved pigment of the present invention wet with the solvent, etc., then I prefer as means for producing the vacuum an injector of the type commonly employed in chemical laboratories and which may be operated from a water-faucet, with however, the difference, that I use as the liquid which flows through the injector toluene instead of water. In this manner the toluene-vapors which come from the still are sucked into the injector and losses of solvent are reduced to a minimum, the condenser is done away with and fire-risk is reduced. In fact I claim this means of producing vacua as novel and as my invention. The contents in the still represent the new product, i. e. the finely dispersed pigment damp with the replacing fluid. Or should the pigment be desired in the dry state, then my invention consists in drying a water-wet pigment by first replacing the water by means of a fluid in the vapor phase and then removing the replacing fluid.

My invention also includes the economical incorporation of my improved pigment into the products to be colored and I will now describe an example which illustrates this feature of my invention. As one example I choose black printers ink. Black printers ink consists of—

(a) Black pigment, generally carbon-black, the product of incomplete combustion of oils or gases.

(b) Printing-ink-varnish which is the product obtained by heating linseed-oil to temperatures between 400° and 600° F. for a time long enough to obtain the desired viscosity. It is evident, that this process consumes a considerable number of heat-units, which on cooling are a total loss. In fact in some cases the heating tanks are equipped with coils through which cold water is circulated after completion of the cooking process and the batch cooled off, thereby carrying away to waste all potential heat-units. These waste heat-units are most economically made use of in the production of printers ink or similar compositions according to my improved process.

In carrying out this improved process I may disperse carbon-black in water, preferably warm, in order to facilitate the escape of air therefrom which tends to cause agglomeration of the pigment particles or contamination or discoloration of certain other pigments such as lead pigments, etc. This air is formed by condensation on the black pigment during cooling in its process of manufacture. The amount of water is governed by the quantity required to make a sludge of the consistency of heavy cream. The dispersion is considered complete when no more clusters or conglomerates of pigment particles are any longer noticeable substantially larger than those precipitated from a fluid state such as a gas as above indicated. To this black dispersion is now added with rapid agitation an amount of toluene equal to about three times the volume of the water used and the whole mass is pumped into a still of the "kneading" type such as that commonly known as the "Werner & Pfleiderer" still. This still is jacketed and is equipped with an agitator which exerts a kneading action. While the agitator is kept going the hot printing-ink varnish prepared by heating linseed oil as above indicated, is now allowed to flow into the still at a rate such that the still contents shows a temperature just sufficient for the distillation of the toluene-water mixture of the pigment-dispersion mixture. Also in this case the toluene of the condensate is returned into the still until there is no more water in the condensate. Now the toluene is removed completely and in the still there remains a perfect homogeneous mass of carbon-black dispersed in printing-ink varnish, which constitutes printers-ink. The advantages of this process are manifold and include:

(a) Complete utilization of heat especially the heat-units stored in the varnish during its manufacture.

(b) Uniform production of very large quantities in a single apparatus (up to several tons at one time).

(c) Elimination of skilled mill attendants required by the present method, as one man can supervise several stills.

(d) Eliminating altogether the grinding of the pigments into the printing-ink-varnish which is so costly requiring individual supervision of each mill, consuming much power and large investments in three-roller mills.

Of course in preparing printers-ink my improved pigment may first be made according to the improved methods previously described before adding it to the varnish or the printing-ink varnish may first be dissolved in sufficient toluene and this solution used as the replacing fluid in the liquid state as already described or the toluene utilized in the vapor state as indicated.

From the above it is evident that the replacing fluid is of a volatile nature in the preferred form of the present invention.

It is also preferred that for storing or shipping of my improved pigment which is damp with the replacing fluid, that the containers be of such construction as to prevent the escape of the replacing fluid therefrom, thus preventing agglomeration of the dispersed pigment particles which result from complete loss of the replacing fluid.

The replacing fluid may also be introduced into the water-pigment sludge or dispersion in the form of its vapor thereby causing a distillation of the mixture of water and replacing fluid.

Before adding the replacing fluid to the water-pigment sludge or dispersion mixture, it is very helpful to add first a small amount of an emulsifier which will act on subsequent distillation as an anti-foaming agent. For instance sulphonated castor-oil or cyclo-hexanol will have this effect.

It will be observed from the foregoing examples that in the method of preparing my improved pigment product I first disperse the pigment in water either by precipitation or otherwise in a state of fine subdivision substantially the same as that produced when the pigment is precipitated in accordance with the method described in connection with the preparation of lead chromate pigment and that after the pigment is obtained in this state of fine subdivision or dispersion in water I maintain this state of fine subdivision or dispersion throughout the remaining steps of my improved process which comprise displacing the water by means of some displacing fluid (such as toluene in the case of lead chromate) the displacing fluid being utilized for this purpose in its vapor state. This vapor state it will be observed can be produced either directly by passing the vapors into the pigment mixture or dispersion or by distillation of the mixture of the displacing fluid, pigment and water to distill off the displacing fluid and water. This step of displacing the water by means of a displacing fluid in the vapor state is carried to the point where the water is entirely removed or displaced from the dispersed pigment without agglomerating the pigment, leaving the pigment wetted with a portion of the displacing fluid. This distillation it will be observed also is carried out either at atmospheric pressure or higher at a temperature sufficiently high to cause distillation of the displacing fluid and the water at the given pressure until the latter is completely removed from the product, or the distillation may be carried out at a pressure lower than that of ordinary atmospheric pressure, this diminished pressure being produced in this case in any convenient manner but preferably by means of an injector operated by means of an auxiliary supply of the displacing fluid in the liquid state which is caused to flow continuously through the injector through a closed cyclic path or conduit. Also it will be observed that the vapors of the displacing fluid and water are collected by condensation by bringing them into contact with the displacing fluid in the cyclic path or conduit and that the condensed displacing fluid is separated from the condensed water and returned to the pigment mixture and that these steps of distillation, condensation, separation of the displacing fluid and the return of the condensed displacing fluid to the pigment are repeated until the pigment is freed from water and is left in a dispersed condition moist or wetted with the displacing fluid.

Notice is hereby given that in my co-pending application Serial Number 307,553, I described and claim certain features of my invention also disclosed but not claimed herein and in the present application I disclose and claim certain other features or improvements not disclosed or claimed in my said co-pending application.

I claim—

1. In the method of preparing a pigment adapted for use in a coating composition, the steps which comprise dispersing the pigment in water in a state of subdivision substantially the same as that produced by precipitation of the pigment from a fluid state and whilst maintaining the pigment in this state of subdivision removing the water by bringing the dispersed pigment and water into intimate contact with the vapor of a displacing fluid, separating the vapor of the displacing fluid from the dispersed pigment to remove the water therefrom and wetting the particles of the comminuted pigment with the displacing fluid, the latter being soluble in and compatible with the coating composition.

2. In the method of preparing a pigmented coating composition the steps which comprise dispersing the pigment in water in a state of subdivision substantially the same as that produced by precipitation of the pigment from a fluid state and subsequently whilst maintaining the pigment in the said state of subdivision removing the water by bringing the dispersed pigment and water into intimate contact with a displacing fluid, with exclusion of atmospheric air and distilling the water and the displacing fluid under diminished pressure, collecting the distillate by condensation, separating the condensed displacing fluid from the water, returning the condensed displacing fluid to the pigment and repeating the steps of distillation, condensation and the returning of the condensed displacing fluid to the pigment until the pigment is freed from water and is wetted with the displacing fluid.

3. In the method of preparing a pigmented coating composition the steps which comprise dispersing the pigment in water in a state of subdivision substantially the same as that produced by precipitation of the pigment from a fluid state and subsequently whilst maintaining the pigment in the said state of subdivision displacing the water by bringing the dispersed pigment and water into intimate contact with a displacing fluid, with exclusion of atmospheric air, and distilling the water and the displacing fluid under diminished pressure, collecting the distillate by condensation, separating the condensed displacing fluid from the water, returning the condensed displacing fluid to the pigment and repeating the steps of distillation, condensation and the returning of the condensed displacing fluid to the pigment until the pigment is freed from water and is wetted with the displacing fluid, the diminished pressure being produced by means of an injector.

4. In the method of preparing a pigmented coating composition the steps which comprise dispersing the pigment in water in a state of subdivision substantially the same as that produced by precipitation of the pigment from a fluid state and subsequently whilst maintaining the pigment in the said state of subdivision removing the water by bringing the dispersed pigment and water into intimate contact with a displacing fluid, with exclusion of atmospheric air, and distilling the water and the displacing fluid under diminished pressure, collecting the distillate by condensation, separating the condensed displacing fluid from the water, returning the condensed displacing fluid to the pigment and repeating the steps of distillation, condensation and the returning of the condensed displacing fluid to the pigment until the pigment is freed from water and is wetted with the displacing fluid, the diminished pressure being produced by means of an injector, operated by means of an auxiliary supply of the displacing fluid in the liquid state which is caused to flow continuously in a closed cycle through the injector.

5. In the method of replacing the water from a water-wet pigment by means of a replacing fluid, the steps which comprise adding a portion of the replacing fluid to the water-wet pigment, vaporizing the water and the replacing fluid from the pigment under diminished pressure produced by means of an injector operated by causing a second portion of the replacing-fluid to flow through the injector in a cyclic path through a conduit which includes the injector as a portion thereof, condensing the vaporized water and vaporized replacing-fluid by bringing their vapors into contact with the replacing fluid in the cyclic path, separating the condensed water from the liquid replacing-fluid, returning a portion of the replacing-fluid from the cyclic path to the pigment and repeating the steps of vaporization, condensation, separation of condensed water and return of replacing-fluid from the cyclic path to the pigment until the water has been replaced from the water-wet pigment by the replacing fluid.

6. In the method of preparing printing ink from printers ink pigment and printers ink varnish the steps which comprise dispersing the printers ink pigment in water in a state of subdivision substantially the same as that produced by precipitation of the pigment from a fluid state, preparing the printers ink varnish by the method of heating a varnish-forming oil, mixing the dispersed or finely subdivided pigment and water with the printers ink varnish whilst the latter is still hot and before it has cooled to a temperature substantially below the temperature at which it is prepared from the varnish-forming oil, and subjecting the mixture of pigment, water and hot printers ink varnish to distillation to distill off the water.

7. In the method of preparing printing ink from carbon-black and printers ink varnish the steps which comprise dispersing the carbon-black in water in a state of subdivision substantially the same as that produced by precipitation of the carbon-black by the method of incomplete combustion of a suitable inflammable gas, preparing the printers ink varnish by the method of heating a varnish-forming oil, mixing the dispersed or finely subdivided carbon-black and water with the printers ink varnish and a suitable displacing fluid whilst the varnish is still hot and before it has cooled to a temperature, substantially below the temperature at which it is prepared from the oil, subjecting the mixture of carbon-black, water displacing fluid and varnish to distillation to distill off the water and a portion of the displacing fluid, collecting the distillate by condensation, separating the condensed displacing fluid from the condensed water, returning the condensed displacing fluid to the mixture containing the carbon-black and repeating the steps of distillation, condensation and the returning of the condensed displacing fluid to the carbon-black until the latter is freed from water and the displacing fluid.

EMILE C. DE STUBNER.